(12) United States Patent
Osadchyy

(10) Patent No.: US 10,051,147 B2
(45) Date of Patent: Aug. 14, 2018

(54) METHOD AND DEVICES FOR MONITORING PRINTING DEVICE THRESHOLDS

(71) Applicant: KYOCERA Document Solutions Inc., Osaka (JP)

(72) Inventor: Oleksandr Osadchyy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 131 days.

(21) Appl. No.: 14/869,418

(22) Filed: Sep. 29, 2015

(65) Prior Publication Data

US 2017/0094103 A1    Mar. 30, 2017

(51) Int. Cl.
*H04N 7/32* (2006.01)
*G06F 3/12* (2006.01)
*G06F 15/00* (2006.01)
*H04N 1/32* (2006.01)
*H04N 1/00* (2006.01)

(52) U.S. Cl.
CPC ......... *H04N 1/32507* (2013.01); *G06F 3/121* (2013.01); *G06F 3/1229* (2013.01); *G06F 3/1235* (2013.01); *G06F 3/1285* (2013.01); *G06F 3/1292* (2013.01); *H04N 1/00042* (2013.01); *H04N 1/00832* (2013.01); *H04N 1/3263* (2013.01); *H04N 1/32635* (2013.01); *H04N 1/32662* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | |
|---|---|---|---|
| 5,612,744 A * | 3/1997 | Lee ...................... | H04N 19/105 348/416.1 |
| 2011/0074856 A1* | 3/2011 | Iesaki ................... | B41J 11/006 347/16 |
| 2011/0172961 A1* | 7/2011 | Sunata ................. | G06F 11/0733 702/179 |
| 2011/0188063 A1* | 8/2011 | Nuggehalli ........ | H04N 1/00233 358/1.13 |

* cited by examiner

*Primary Examiner* — Neil R McLean
*Assistant Examiner* — Darryl V Dottin
(74) *Attorney, Agent, or Firm* — McDonnell Boehnen Hulbert & Berghoff LLP

(57) ABSTRACT

The present disclosure is directed to systems, methods, and devices that enable monitoring of threshold values related to parameters within a printing device through the communication of one or more terminal devices and the printing device with a threshold subscription unit. The terminal devices transmit threshold values to be monitored to the threshold subscription unit. The threshold subscription unit then orders those threshold values into a queue and assigns one to the printing device. Upon receiving an alert from the printing device that a parameter value related to the assigned threshold value has been reached, the threshold subscription unit notifies the terminal devices of this and assigns the next threshold value in the queue to the printing device. This continues until all threshold values in the queue have been reached.

20 Claims, 7 Drawing Sheets

METHOD AND DEVICES FOR MONITORING PRINTING DEVICE THRESHOLDS

BACKGROUND

Unless otherwise indicated herein, the materials described in this section are not prior art to the claims in this application and are not admitted to be prior art by inclusion in this section.

In many instances, it can be useful to remotely monitor printing devices. By monitoring these devices, it can be determined whether replacement paper or toner needs to be supplied, for example. Additionally, when a multiplicity of printing devices are available for performing a given printing task, data gathered by monitoring, such as a number of pending jobs or a number of paper jams experienced within the last day, can be used in the process of choosing which of the printing devices to use.

Conventionally, monitoring printing devices is done using Simple Network Management Protocol (SNMP), in which the printing device acts as a managed device, constantly executing an "agent" (a software that communicates monitored printer parameters to a managing device). In many configurations, the printing device will only respond with parameter values if polled by the managing device (such metadata is defined within a management information base, or MIB).

Frequently, the managing device only performs actions based on the parameter values if they reach a critical point, such as when the amount of toner falls below 10%, for instance. Thus, superfluous polling by the managing device can occur. In some cases, however, the "agent" transmits a "trap", which is an asynchronous notification to the managing device. This enables the "agent" to notify the managing device of important events using an unsolicited message.

Optimally, printing devices could be configured to transmit a "trap" every time a threshold condition were met, such that at such a threshold, at least one terminal device within the network of the printing device would benefit from learning of such a threshold condition being met. Some printing devices, however, have limited, on-board resources. Due to this, such printing devices may only be able to store a limited number of threshold conditions.

Furthermore, printing devices can be monitored by having the printing devices communicating with a cloud server over the public Internet using protocols such as Extensible Messaging and Presence Protocol (XMPP), Hypertext Transfer Protocol (HTTP), Bidirectional-streams Over Synchronous HTTP (BOSH), WebSocket, Representational State Transfer (REST), or Simple Object Access Protocol (SOAP), for example. In such methods, polling by a managing device (cloud server) does not occur, and traffic efficiency depends primarily on how accurately the printing devices know which data to submit to the cloud server, and when.

Therefore, such methods still require configuring many triggers within the printing devices. Again, some printing devices are limited by their embedded resources. Consequently, only a limited number of threshold conditions can be stored even using these methods.

SUMMARY

The present application discloses embodiments that relate to systems, methods, and devices for monitoring thresholds of parameters within printing devices. The monitoring occurs using a threshold subscription unit, and involves receiving threshold values from subscribed terminal devices, establishing a queue of the threshold values, and communicating with a printing device and the subscribed terminal devices about the threshold values.

In one aspect, the present application describes a method of monitoring thresholds. The method includes receiving, by a threshold subscription unit, a first threshold value and a second threshold value transmitted by one or more terminal devices. The first threshold value and the second threshold value differ from one another and are values relating to a parameter of a printing device. The method also includes establishing, by the threshold subscription unit, a queue corresponding to the printing device. The queue includes an ordered list of threshold values for the parameter of the printing device. The queue additionally includes the first threshold value and the second threshold value. Additionally, the method includes assigning, by the threshold subscription unit when a parameter value related to the first threshold value within the printing device has not previously attained a level corresponding to the first threshold value, the first threshold value to the printing device. The method further includes alerting, by the printing device, the threshold subscription unit that a parameter value related to the first threshold value has attained a level corresponding to the first threshold value. Still further, the method includes notifying, by the threshold subscription unit, the one or more terminal devices that the parameter value related to the first threshold value has attained the level corresponding to the first threshold value. In addition, the method includes assigning, by the threshold subscription unit when a parameter value related to the second threshold value within the printing device has not previously attained a level corresponding to the second threshold value, the second threshold value to the printing device.

In another aspect, the present application describes a threshold subscription unit. The threshold subscription unit includes a communication unit. The communication unit is configured to receive a first threshold value and a second threshold value transmitted by one or more terminal devices. The first threshold value and the second threshold value differ from one another and are values relating to a parameter of a printing device. The communication unit is also configured to receive an alert from the printing device signaling that a parameter value related to the first threshold value has attained a level corresponding to the first threshold value. Further, the communication unit is configured to assign the first threshold value, when the parameter value related to the first threshold value has not attained the level corresponding to the first threshold value, and the second threshold value, when a parameter value related to the second threshold value has not attained a level corresponding to the second threshold value, to the printing device. The assigning of the second threshold value occurs upon receiving the alert from the printing device. Additionally, the communication unit is configured to notify the one or more terminal devices of the alert. In addition, the threshold subscription unit includes a management unit. The management unit is configured to add the first threshold value and the second threshold value to a queue corresponding to the printing device. The queue includes an ordered list of threshold values for the parameter of the printing device. Also, the management unit is configured to remove the first threshold value from the queue. The first threshold value is removed from the queue upon the communication unit receiving the alert.

In a third aspect, the present application describes a printing device. The printing device includes a memory unit configured to individually (one at a time) store a first threshold value and a second threshold value. The first threshold value and the second threshold value differ from one another and relate to a parameter of the printing device. In addition, the first threshold value and second threshold value were individually transmitted by one or more terminal devices and separately assigned by a threshold subscription unit. The printing device further includes a device-monitoring unit configured to monitor a parameter value related to the first threshold value. Still further, the printing device includes a comparison unit, configured to compare the first threshold value to the parameter related to the first threshold value. Additionally, the printing device includes a communication unit. The communication unit is configured to transmit an alert to the threshold subscription unit. The alert signals that the parameter value related to the first threshold value has attained a level corresponding to the first threshold value. The communication unit is also configured to receive assignments of the first threshold value, when the parameter value related to the first threshold value has not attained the level corresponding to the first threshold value, and the second threshold value, when a parameter value related to the second threshold value has not attained a level corresponding to the second threshold value, from the threshold subscription unit. The second threshold value is received after the transmission of the alert by the communication unit.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
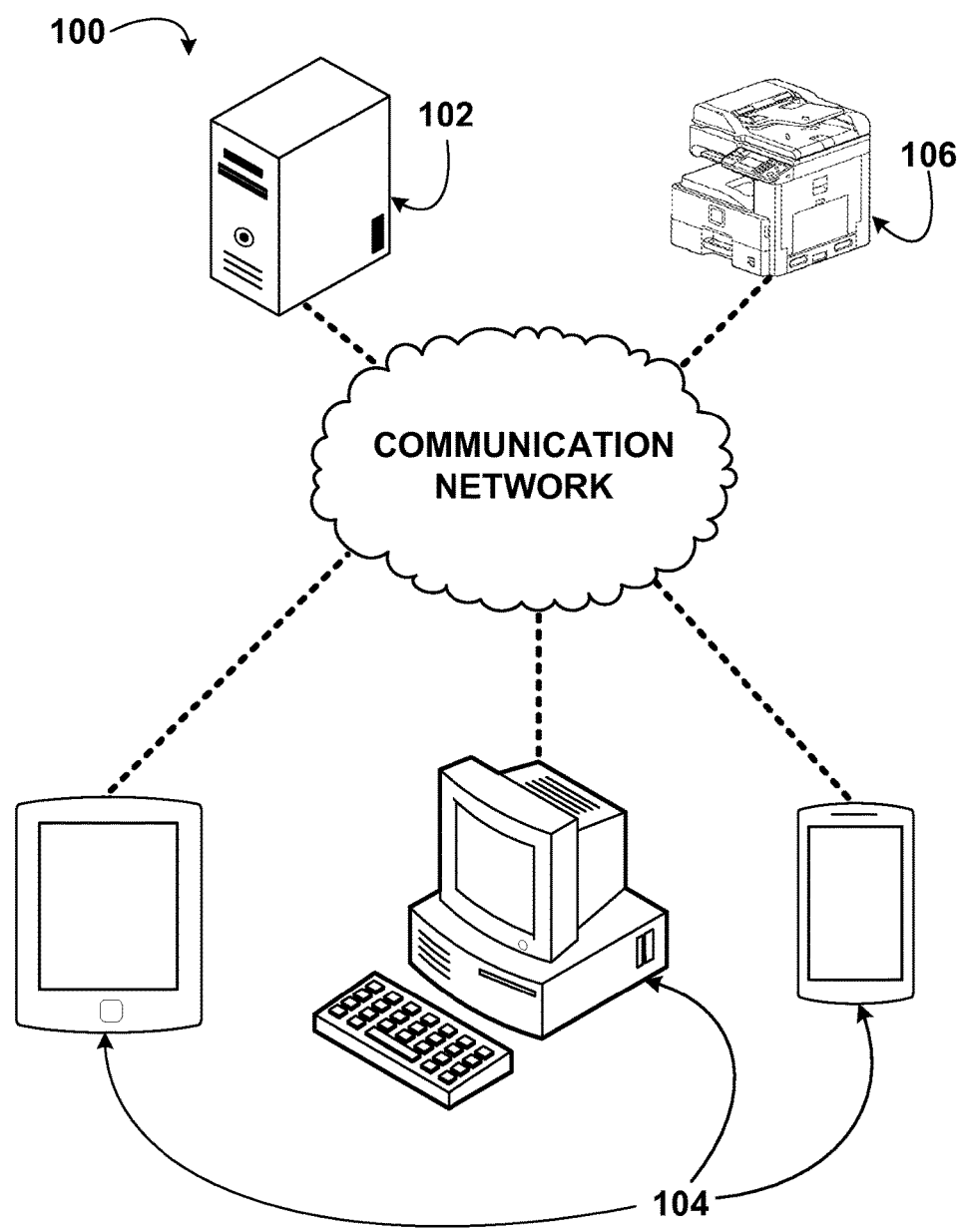
FIG. 1 is a schematic diagram illustrating a system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. OVERVIEW

An example embodiment involves a threshold subscription unit monitoring threshold values within a printing device. In this embodiment, the threshold values are transmitted by terminal devices. Further, in this embodiment, the threshold subscription unit is a cloud server and the terminal devices are desktop computing devices, tablet computing devices, or mobile computing devices.

In one embodiment, the threshold subscription unit receives multiple threshold values from one or more terminal devices. The threshold values relate to one or more parameters within the printing device, such as toner level or number of paper jams.

After receiving the threshold values, the threshold subscription unit creates a queue. The queue is an ordered list of the threshold values such that the parameter value related to the threshold value at the front of the queue is reached first, the second in the queue is reached second, and so on.

The threshold subscription unit then assigns the threshold value at the front of the queue to the printing unit. The process of assigning the threshold value at the front of the queue to the printing device may include setting a trigger level within the printing device corresponding to the related parameter value achieving the threshold value at the front of the queue.

Upon the related parameter value attaining a value that corresponds to the threshold value at the front of the queue, the printing device alerts the threshold subscription unit.

When the threshold subscription unit is alerted, it will notify the terminal devices that the parameter value related to the threshold value at the front of the queue has reached the value corresponding to the threshold value. Additionally, the threshold subscription unit may remove the threshold value at the front of the queue from the queue.

The threshold subscription unit then assigns the next threshold value in the queue to the printing device, again setting a trigger level within the printing device. Similarly, the threshold subscription unit receives an alert when a value corresponding to the assigned threshold value is attained by the parameter value, the threshold subscription unit notifies the terminal devices, and the threshold subscription unit removes the assigned threshold value from the queue. This process of assigning a threshold value, receiving an alert, notifying the terminal devices, and removing the threshold value from the queue continues until the queue no longer contains any threshold values.

II. EXAMPLE SYSTEMS

FIG. 1 is a schematic diagram illustrating a system 100, according to an example embodiment. The system 100 includes a threshold subscription unit 102, three terminal devices 104, and a printing device 106 that communicate over a network.

The terminal devices 104 and the printing device 106 communicate with the threshold subscription unit 102. This may occur over a public network (like a cloud), such as the public Internet, or over a private network, such as a local area network (LAN). This communication may take place wirelessly, using Bluetooth or Wi-Fi (IEEE 802.11 standards), or in a wired way, using Ethernet, for example.

Figure 2:
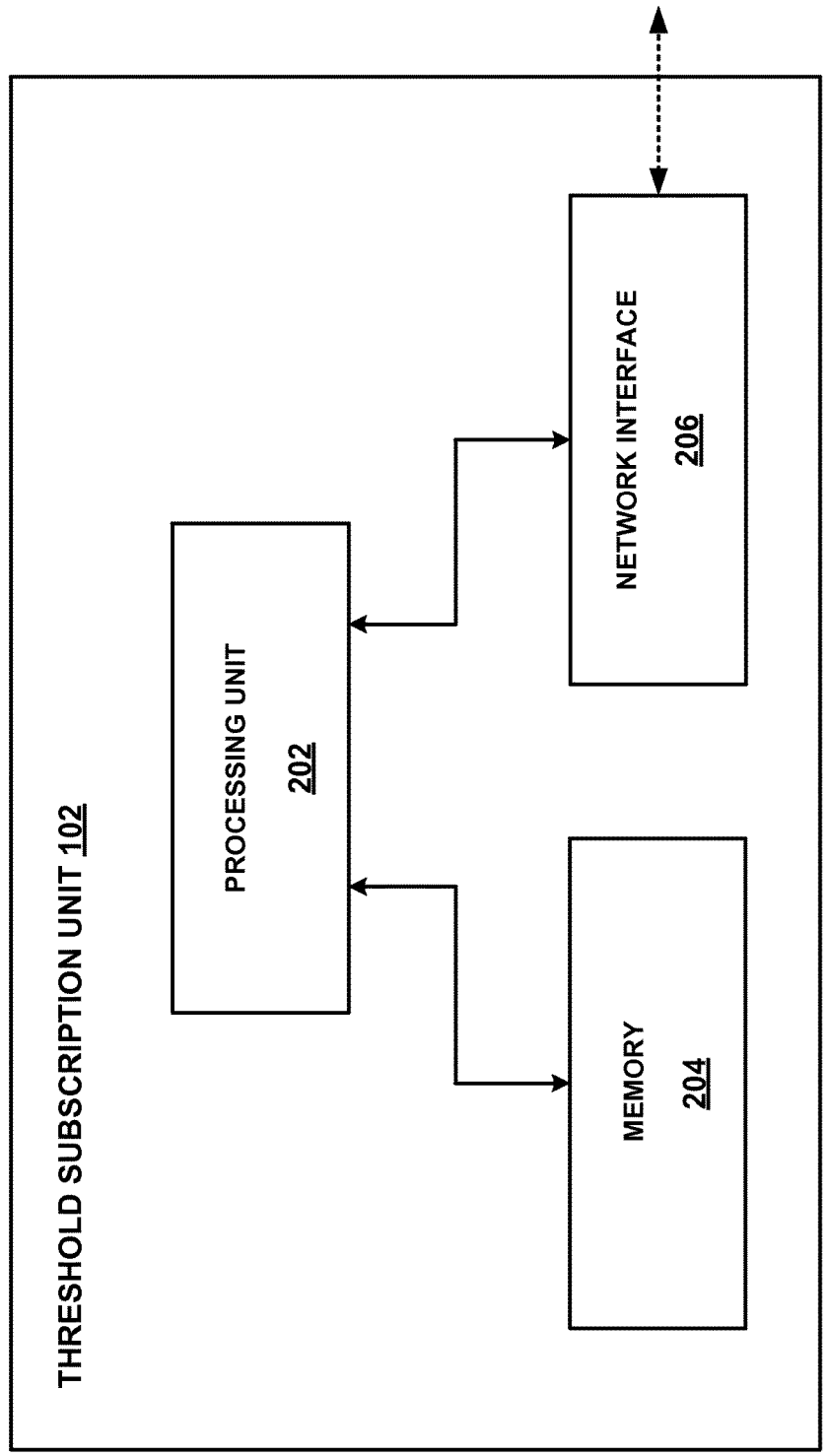
FIG. 2 is a schematic block diagram illustrating a threshold subscription unit, according to an example embodiment.

The threshold subscription unit 102 is a server that facilitates the indirect interaction between the terminal devices 104 and the printing device 106 (described in detail with regard to FIG. 2). The threshold subscription unit 102 receives threshold values to be monitored from the terminal devices 104 (described in detail with regard to FIGS. 6 and 7). The threshold subscription unit 102 selectively assigns the threshold values to the printing device 106, as well as alerts the terminal devices 104 when the threshold values are reached.

The threshold subscription unit 102 may be a subscription service associated with a cloud server. Each of the terminal devices 104 may have credentials required to authenticate the device before logging into the subscription service. Additionally, the subscription service may host multiple networks of printing devices, permitting only those terminal devices 104 with the requisite permissions to submit threshold values directed to printing devices within specific networks.

The threshold subscription unit 102 executes a software contained within a computer-readable medium to manage the threshold values received from the terminal devices 104. The threshold values received from the terminal devices 104 may be stored locally within a memory within the threshold subscription unit 102, such as an internal hard drive. Alternatively, the threshold subscription unit 102 may store this data remotely, on a separate cloud storage space, for example.

The terminal devices 104 are devices that communicate threshold values to the threshold subscription unit 102 for monitoring. The terminal devices 104 may be one of a number of devices, including tablet computing devices, laptop computing devices, desktop computing devices, and mobile computing devices. The terminal devices 104 may be within the same network as the printing device 106, although they need not be. In addition to participating in the monitoring of threshold values associated with the printing device 106, the terminal devices 104 may be configured to perform other tasks.

The printing device 106 is configured to reproduce digital data by printing it. In some embodiments, this will be a two-dimensional (2D) print onto a paper using ink. It may, in some instances, be three-dimensional (3D) printing, however. In addition to printing, the printing device 106 may be configured to perform other tasks, such as scanning or faxing, as is the case when the printing device 106 is a multi-functional peripheral (MFP).

Also, the printing device 106 communicates with the threshold subscription unit 102 to transfer information about threshold values. For example, the printing device 106 may send an alert that a threshold value related to one of its parameter values has been reached, or the printing device 106 receiving an assignment of a new threshold value.

III. EXAMPLE DEVICES

FIG. 2 is a schematic block diagram of a threshold subscription unit 102, according to an example embodiment. The threshold subscription unit 102 includes a processing unit 202, a memory 204, and a network interface 206.

The processing unit 202 may include one or more processors capable of executing instructions, such as a set of instructions that execute a threshold subscription service (a threshold subscription software), stored on computer-readable media, such as the memory 204, which cause the threshold subscription unit 102 to perform various operations. The processing unit 202 may include general-purpose central processing units (CPUs) and cache memory.

In some embodiments, the threshold subscription unit 102 may take the form of a server. In such embodiments, the processing unit 202 may be a commercial processing unit, such as Intel Corporation's Xeon line of microprocessors or the Opteron series by AMD.

The processing unit 202 reads from and writes to the memory 204, as well as communicates with the network interface 206. Communication between the processing unit 202 and other components of the threshold subscription unit 102 may take place over integrated motherboard connections, in some embodiments.

The memory 204 may store threshold values transmitted to the network interface 206 from terminal devices 104. Furthermore, as the threshold subscription unit 102 establishes and maintains a queue of threshold values, the queue may be stored within the memory 204.

Additionally, the memory 204 may store the instructions that are executed by the processing unit 202 to perform various operations, such as to establish a queue of threshold values. These instructions may take the form of a threshold subscription software stored within the memory 204.

The memory 204 may be located in the same physical vicinity as the processing unit 202, in some embodiments. In such embodiments, the memory 204 may take the form of an internal or external hard drive. Alternatively, in some embodiments, the memory 204 will be remotely located, such as in the case where the memory 204 is a remote cloud storage space or remote server.

The network interface 206 is responsible for communicating with the terminal devices 104 and the printing device 106. In some embodiments, if the memory 204 is a remote server, for example, the network interface 206 may additionally need to communicate with the memory 204.

The network interface 206 may provide the printing device 106 with assignments of threshold values, as well as receive alerts from the printing device 106 that threshold values have been reached. Also, the network interface 206 may receive threshold values to be added to the queue from the terminal devices 206, in addition to notifying the terminal devices 206 when the threshold values have been reached within the printing device 106.

The network interface 206 forwards these communications on to the processing unit 202, so the processing unit 202 may take appropriate action. An example of an action taken by the processing unit 202 in response to a communication is updating the queue stored within the memory 204 by removing a threshold value from the queue in response to receiving an alert that the threshold value has been reached.

The network interface 206 may communicate with other devices over the public Internet. This may occur by a wireless connection to a router, using Wi-Fi, or in a wired manner, using an Ethernet connection. If a connection to the public Internet is required, the network interface 206 may be a network interface controller (NIC).

Figure 3:
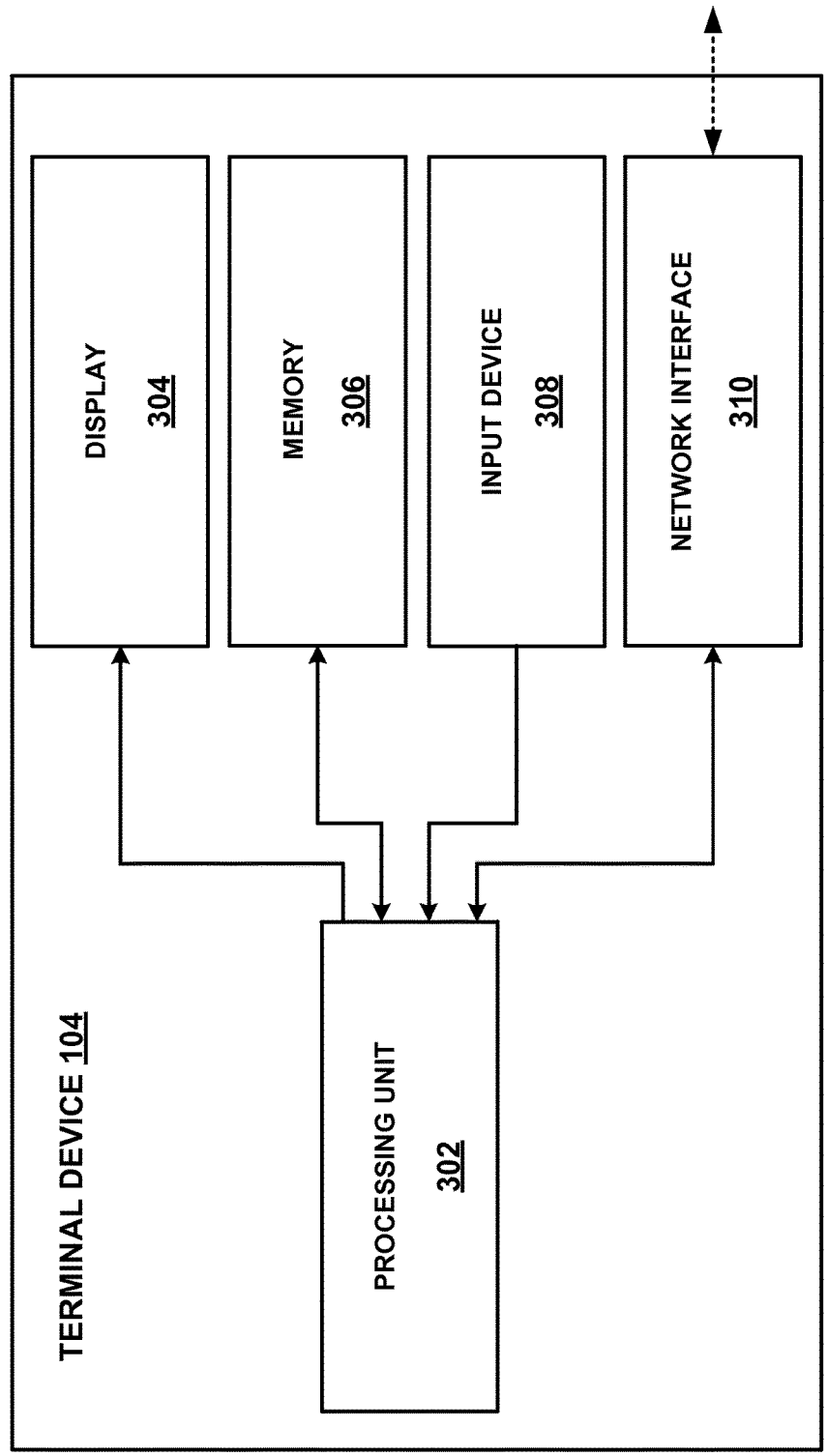
FIG. 3 is a schematic block diagram illustrating a terminal device, according to an example embodiment.

FIG. 3 is a schematic block diagram of one of the terminal devices 104, according to an example embodiment. The terminal device 104 includes a processing unit 302, a display 304, a memory 306, an input device 308, and a network interface 310.

The processing unit 302 may include one or more processors capable of executing instructions, such as a set of instructions that execute a threshold subscription service (a threshold subscription software), stored on computer-readable media, such as the memory 306, which cause the terminal device 104 to perform various operations. The processing unit 302 may include general-purpose central processing units (CPUs) and cache memory.

In causing the terminal device 104 to perform various operations, the processing unit 302 directly communicates with other units of the terminal device 104. In some embodiments, such as when the terminal device 104 is a desktop computing device, this communication occurs through connections on a motherboard.

If the terminal device 104 is a desktop computing device or a laptop computing device, as in some embodiments, the processing unit 302 may be a commercially available processing unit, such as Intel Corporation's Core i7 microprocessors or the Bulldozer microarchitecture line by Advanced Micro Devices, Inc. (AMD).

In other embodiments, when the terminal device 104 is a tablet computing device or a mobile phone, the processing unit 302 may be a microprocessor such as the Apple A8 or the Qualcomm Snapdragon series.

The display 304 serves as a device by which the terminal device 104 can externally display information. In an embodiment in which the terminal device 104 is a desktop or laptop computing device, the display 304 may be a cathode ray tube (CRT) monitor, a liquid crystal display (LCD), or a light-emitting (LED) display. Additionally, the display 304 may be connected to the processing unit 302 directly, via routing on a motherboard, or indirectly, via a digital visual interface (DVI) cable or high-definition multimedia interface (HDMI) cable.

In embodiments in which the terminal device 104 is a tablet computing device or a mobile phone, the display 304 may be an organic light-emitting diode (OLED) display or an LCD, for example.

The memory 306 has a primary functionality within the terminal device 104 of storing the threshold subscription software. This software is executed to communicate with the threshold subscription unit 102 to monitor thresholds within the printing device 106.

The memory 306 may store additional data, such as data about the status of threshold values transmitted previously to the threshold subscription unit 102 or notifications received from the threshold subscription unit 102. For instance, it may be useful to track the rate at which black toner is falling within the printing device 106 to monitor use. This could be done by recording, based on notifications received from the threshold subscription unit 102, times at which thresholds in intervals of 5% are reached by the printing device 106. Such data could be saved in a file to the memory 306.

In some embodiments, the memory 306 will be an internal hard drive. Alternatively, the memory 306 may be a solid-state drive (SSD). Furthermore, in some embodiments, the memory 306 may be a removable component of the terminal device 104, as in the cases when the memory 306 is an external hard drive, a USB flash drive, or a secure digital (SD) card.

The memory 306 may also store information for various programs and applications. For example, the memory 206 may include data for running an operating system (OS). The memory 306 is not necessarily limited to non-volatile memory, but in some embodiments may also include volatile memory, such as random access memory (RAM). Such components may be necessary for the processing unit 302 to execute the threshold subscription software, for instance.

As with other components within the terminal device 104, the memory 306 may be read by the processing unit 302 over integrated motherboard connections. The memory 306 may be connected to the motherboard using a Serial ATA (SATA) cable, in the case of an internal hard drive, or connected to a bus port integrated on the motherboard, in the case of removable memory, such as an external hard drive or USB flash drive.

The input device 308 communicates a user's input to the processing unit 302. If the terminal device 104 is embodied in the form of a desktop or laptop computing device, the input device 310 may be a mouse or a keyboard. The mouse or keyboard may be connected to the processing unit 302 via internal motherboard connections, as well as connected to the motherboard in a wired manner using USB ports or PS/2 ports. Additionally, the mouse or keyboard may be wirelessly connected to the motherboard using Bluetooth.

In other embodiments, such as when the terminal device 104 is a mobile phone or a tablet computing device, the input device 308 may be a touchscreen, incorporating a touch-sensitive surface that overlays or is overlaid by the display 304. The touchscreen may be executed using resistive touch, surface capacitive, projected capacitive, or infrared (IR) touch technologies, in various embodiments.

Furthermore, in some embodiments, the input device 308 will not require tactile interaction. The input device 308 may instead be implemented as a microphone that accepts voice commands from a user or a camera that accepts hand motions or facial expressions as commands. Depending on the embodiment, the microphone or the camera may be in direct connection with the processing unit 302 via direct integration onto a motherboard, or may be connected to the motherboard via a USB connection or Bluetooth connection.

The network interface 310 is configured to enable communication between the terminal device 104 and the threshold subscription unit 102. It is through the network interface 310 that the terminal device 104 transmits threshold values to and receives notifications from the threshold subscription unit 102.

The network interface 310 is connected to the processing unit 302. This permits the processing unit 302 to send commands to the network interface 310, permitting the terminal device 104 to communicate with the threshold subscription unit 102 while executing the threshold subscription software. This connection, in some embodiments, will be via routing on a motherboard.

The network interface 310 may be a wired or wireless interface. In some embodiments, the network interface 310 will be a NIC that allows connection to the public Internet over Wi-Fi via a router. There may also be a wired connection to the public Internet, in some embodiments, using Ethernet.

In some embodiments, the threshold subscription unit 102, the terminal device 104, and the printing device 106 may all be in the same network. If this were the case, the necessity for the network interface 310 to connect to the public Internet may be obviated.

Figure 4:
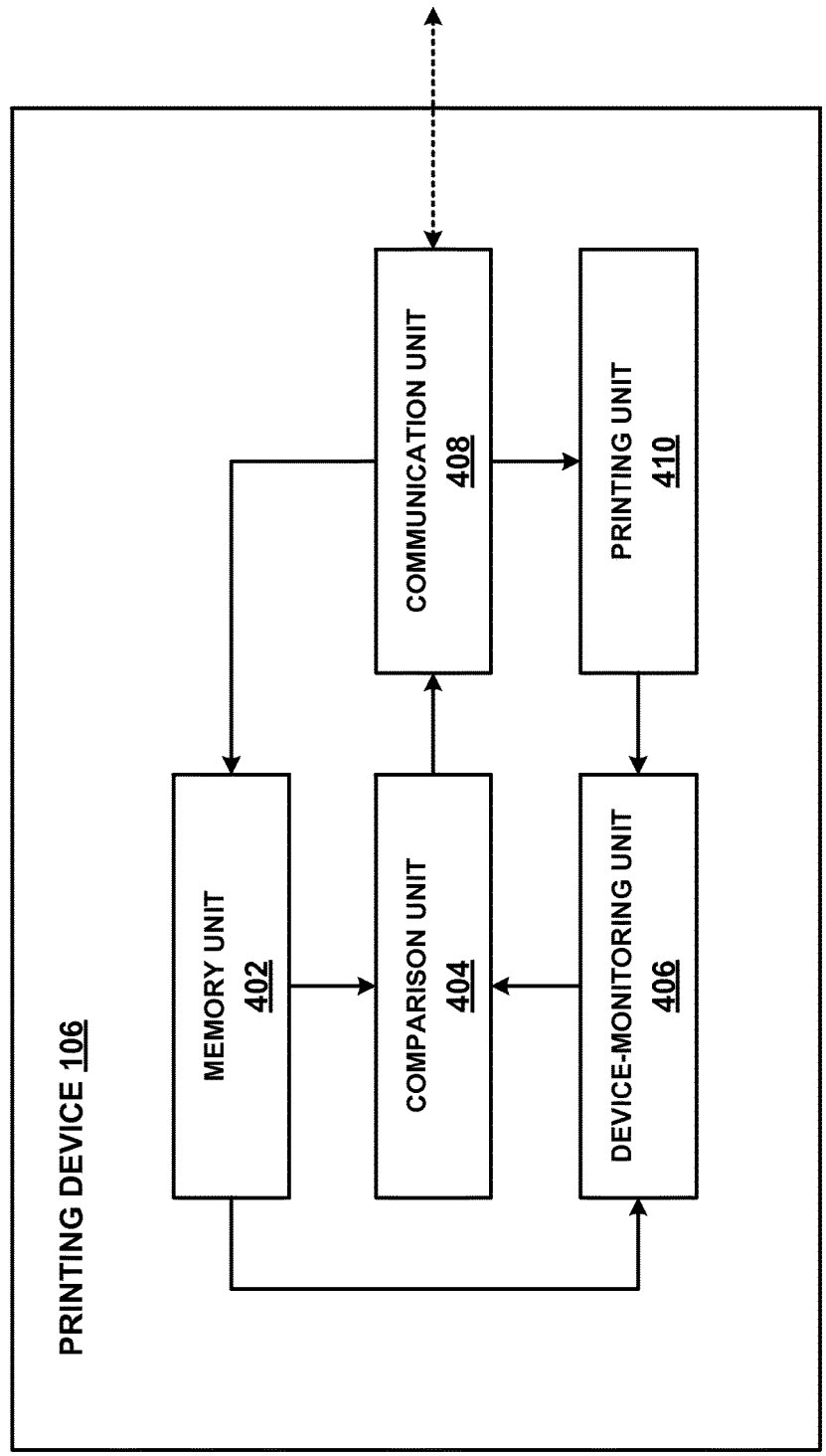
FIG. 4 is a schematic block diagram illustrating a printing device, according to an example embodiment.

FIG. 4 is a schematic block diagram of the printing device 106, according to an example embodiment. The printing device 106 includes a memory unit 402, a comparison unit 404, a device-monitoring unit 406, a communication unit 408, and a printing unit 310.

The memory unit 402 stores a threshold value assigned by the threshold subscription unit 102 to the printing device 106. Such a threshold value would arrive to the printing device 106 at the communication unit 408, and be routed from there to the memory unit.

The memory unit 402 may additionally contain instructions to be executed by a processing unit within the printing device 106. These instructions may constitute firmware or an instance of threshold subscription software configured to run on the printing device 106. Such firmware or software may be embodied in the form of the comparison unit 404.

Furthermore, the memory unit 402 may be read by the device-monitoring unit 406. The device monitoring unit 406 may gather from the memory unit 402 which parameters in the printing unit 410 are related to threshold values currently stored within the memory unit 402. This would indicate to the device-monitoring unit 406 which parameters in the printing unit 410 should currently be monitored.

The comparison unit 404 takes parameter values from the device-monitoring unit 406 and compares them to assigned threshold values contained within the memory unit 402. As previously stated, the comparison unit 404 may be firmware or software, contained within the memory unit 402, executed by a processing unit within the printing device 106. The software would, in some instances, be very minimal. This may be due to the memory unit 402 within the printing device 106 having limited resources.

The comparison unit 404 may, in some embodiments, continuously or frequently compare the parameter value input from the device-monitoring unit 406 to the assigned threshold value input from the memory unit 402. In some embodiments, there can be multiple assigned threshold values being compared to multiple parameter values at once, such as when the assigned threshold values are related to different device parameters, for instance.

An alert is triggered when the comparison unit 404 detects that the assigned threshold value from the memory unit 402 is above (below) the parameter value input from the device-monitoring unit 406 in the case of a decreasing parameter (in the case of an increasing parameter). When the alert is triggered, the comparison unit 404 formulates a message indicating that the threshold condition of the assigned threshold value was met. The comparison unit 304 then sends the alert to the communication unit 408 for further dispatch.

The device-monitoring unit 406 is configured to monitor the status of certain parameters within the printing unit 410 for the purpose of transmitting the values of the parameters to the comparison unit 404. The device-monitoring unit 406 reads assigned parameters to monitor from the memory unit 402. The device-monitoring unit 406 monitors only those parameters which are related to threshold values that have been indicated in the memory unit 402.

Examples of parameters that may be monitored by the device-monitoring unit 406 are paper level, toner level, paper jam count, number of jobs processed count, error count, error ratio, pending jobs count, functional count, color count, paper size count, or coverage level count. Some of these parameters are measured physically, such as the paper level or toner level. This may be done through the use of a digital scale within the device-monitoring unit 406 that weighs the paper tray, and can thus provide an estimate of the amount of paper left based on the average weight of a single sheet of paper. A similar method can be used to estimate remaining toner level.

Some of the parameters, however, are monitored by incrementing a count within the device-monitoring unit 406 each time a specific task occurs within the printing unit 410. This is true of such parameters as the number of jobs processed count. Each time the printing unit 410 successfully prints a document, the device-monitoring unit may increment a counter to retain the information that a previously initiated job was successfully completed.

The communication unit 408 is configured to receive assignments of threshold values from the threshold subscription unit 102 and transmit alerts to the threshold subscription unit 102 when thresholds are met. Additionally, the communication unit 408 acknowledges printing requests received from other devices, and routes them to the printing unit 410.

Upon receiving threshold value assignments from the threshold subscription unit 102, the communication unit 408 passes the threshold value assignments to the memory unit 402 for storage. The communication unit 408 is also instructed to transmit alerts to the threshold subscription unit 102 by the comparison unit 304.

Similar to the network interfaces 206/310, the communication unit 408 may be a wired or wireless interface. In some embodiments, the communication unit 408 will be a NIC that allows connection to the public Internet over Wi-Fi via a router. There may also be a wired connection to the public Internet, in some embodiments, using Ethernet.

In some embodiments, the threshold subscription unit 102 and the printing device 106 may be in the same network. If this were the case, the necessity for the communication unit 408 to connect to the public Internet may be obviated.

The printing unit 410 is configured to reproduce digital data. The printing unit 410 receives printing requests from the communication unit 408. These requests may be initiated by other devices and transmitted to the printing device 106.

In some embodiments, this may be a 2D reproduction of a document onto a piece of paper. In such embodiments, the printing unit 310 may be a laser printing unit, an inkjet printing unit, or a dot matrix printing unit, for example. In alternate embodiments, the printing unit 410 may be capable of 3D reproduction using extrusion deposition, photopolymerization, or lamination methods.

There may be one or more parameters within the printing unit 410. These parameters can correspond to threshold values stored within the memory unit 402. Example parameters include remaining paper in a given paper tray, toner level of various colors remaining, and number of jobs pending. The values of each of the parameters within the printing unit 410 may be monitored by the device-monitoring unit 406.

IV. EXAMPLE INTERFACES

Figure 5:
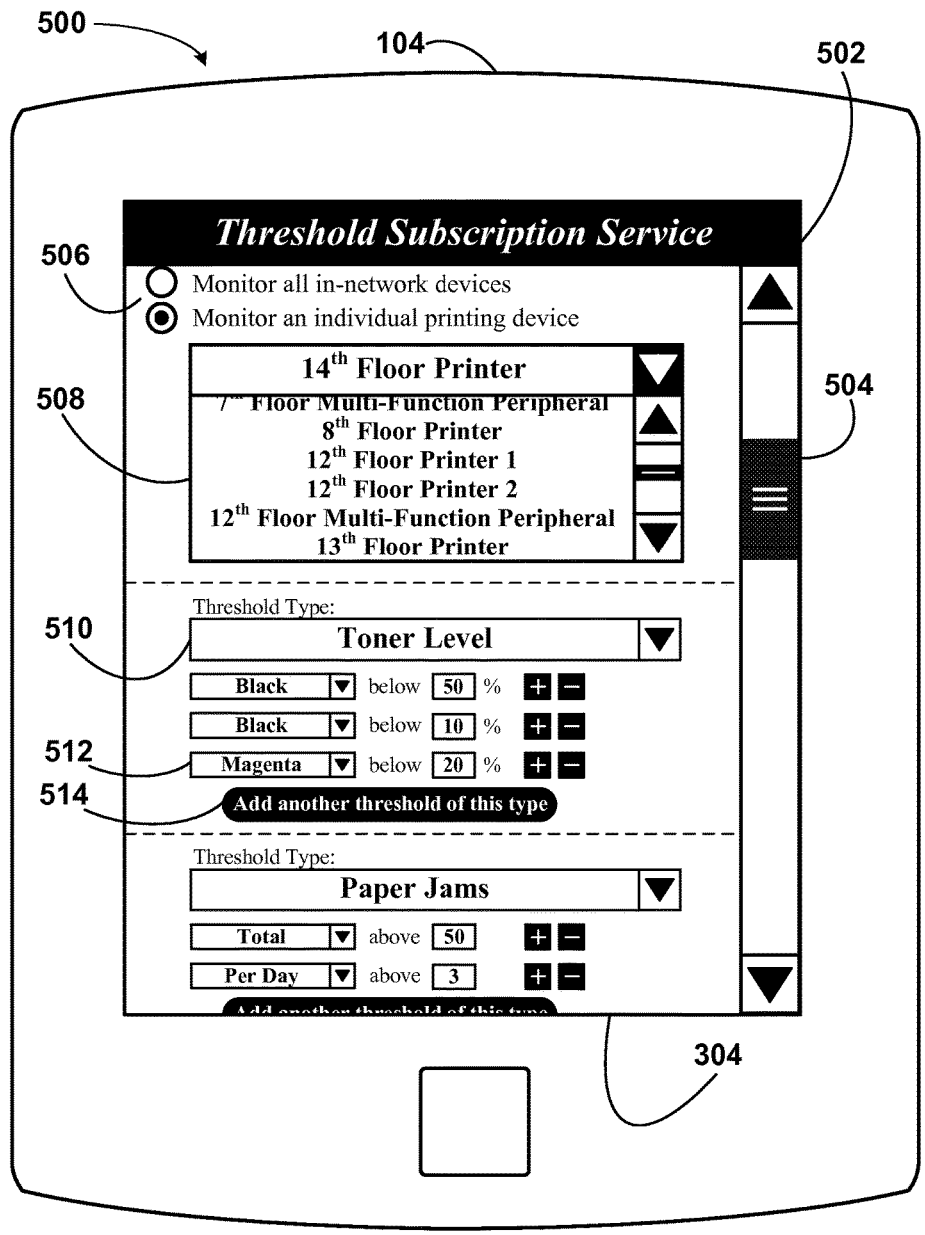
FIG. 5 is an example illustration of a user interface, according to an example embodiment.

FIG. 5 is an illustration 500 of a user interface for use with a threshold subscription service on a display 304 within a terminal device 104, according to an example embodiment. The user interface includes a title 502 located at the top of the interface, a global scrollbar 504, a universal or individual radio button toggle 506, an individual printing device selection tool 508, a threshold type selection tool 510, a threshold subtype selection tool 512, and a button 514 for adding another threshold of a same threshold type.

In this embodiment, this is the interface through which the terminal device can prescribe selections of threshold values to monitor within selected printing devices. Upon altering the selections (using an input device 308) in this user interface, the terminal device 104 would transmit a message (using a network interface 310) to a threshold subscription unit 102 to update a queue of threshold values within the threshold subscription unit 102. There may additionally be, in some embodiments, a "submit changes" button at the bottom of the user interface, whereby engaging the "submit changes" button would scan the user interface to see if any updates had been made to the threshold values being monitored.

In this example embodiment, the terminal device 104 has the form of a tablet computing device. Therefore, the threshold subscription service may take the form of an application stored on a non-transitory, computer-readable medium 306 within the terminal device 104 and executed by a processing unit 302, also within the terminal device 104.

The threshold subscription service application could be designed for iOS, Windows Phone, Android or other mobile platforms. In one embodiment, the threshold subscription service application is written in the Objective-C language. Alternatively, the threshold subscription service application may be implemented in a JavaScript environment. Using this language would provide a portable way to bring the threshold subscription service application to browser-based terminal devices, such as laptop computing devices, desktop computing devices, or other tablet computing devices. Other languages could be used, as well.

The title 502 serves as an identifier, indicating that the user interface currently being displayed is one for the threshold subscription service. In some embodiments, the title 502 may also include information such as a current network of printing devices being accessed, a username associated with the user currently logged in to the service, or an indication if the user interface being displayed is a sub-interface within the primary interface of the threshold subscription service.

The global scrollbar 504 is configured to access different areas within the interface. In some embodiments, the global scrollbar 404 may not be included. It may not be required if the input device 308 is a touch screen, for instance, such that a "swipe" motion will scroll through the interface. Additionally, if the terminal device 104 is a desktop computing device, the global scrollbar 504 may be unnecessary if the input device 308 is a mouse equipped with a scroll wheel, thereby bypassing the need for the global scrollbar 504. Still, if the global scrollbar 504 is not essential, it may still be included in the interface to permit quick access of specific regions within the interface.

The universal or individual radio button toggle 506 is configured to permit the selection of all printing devices within a given network or an individual printing device. In some cases, it may be important to monitor all in-network devices. For example, if a terminal device 104 were monitoring all printing devices within an office to establish if any of them became jammed so that a repair task may be dispatched, it would be imperative to monitor all of them. Engaging the top button in the universal or individual radio button toggle 506 would associate the threshold monitoring throughout the rest of the interface with all printing devices that are in-network, whereas engaging the bottom button in the universal or individual radio button toggle 506 would only associate the printer indicated in the individual printing device selection tool 508.

The individual printing device selection tool 508 allows for a selection of one or more devices. In some embodiments, the individual printing device selection tool 508 may only appear on the user interface if the bottom button in the universal or individual radio button toggle 506 were engaged. Also in some embodiments, such as when the terminal device 104 is a desktop computing device, it may be permitted to select a plurality of printing devices by selecting them all at once, such as by holding one button on a keyboard (CTRL) while highlighting multiple devices by clicking on them using the mouse.

The threshold type selection tool 510 indicates the selection of the threshold type to be monitored within the currently selected printing device(s). As is displayed in the illustration 500, there may be more than one set of threshold types being monitored. Threshold types, in some embodiments, will be sensed from the printing device. Therefore, the user interface may only allow for the selection, using the threshold type selection tool 510, of those indicated as available by the printing device. In some embodiments, it may also be possible to leave one or more of the threshold type selection tool 510 fields blank, if only one type of threshold requires monitoring, for instance.

In addition to "Toner Level" and "Paper Jams", additional threshold types may include "Paper Level", "Error Count", "Error Ratio", "Jobs Processed", "Pending Jobs", "Functional Count", "Color Count", "Paper Size Count", and "Coverage Level Count", in some embodiments.

The threshold subtype selection tool 512 permits the selection of subtypes of threshold within each threshold supertype. For instance, within the supertype of "Toner Level", a selection of black, cyan, magenta, or yellow toner can be made. This permits the monitoring of toner thresholds of various colors within printing devices. The associated text in each section, such as "below", "above", and "%" may provide additional indication to a user of what the number field that is associated with the threshold value describes.

The number field associated with the threshold subtype selection tool 512 may be edited to arrive at the required value of the threshold subtype for monitoring within the printing device. This modification may occur manually, as by typing in the numbers if the terminal device 104 is a desktop computing device, or by pressing the associated plus/minus buttons. These buttons will increase/decrease the number in the number field when engaged.

Again, as with the threshold type selection tool 510, only those subtype thresholds sensed from the printing device may be displayed, in some embodiments. Also, a default threshold subtype may be entered into the threshold subtype text fields within the threshold subtype selection tool 512 to begin with. In some instances, such as with a printing device that does not permit color printing, the default selection may be the only selection available. In other embodiments, the default selection may represent the most used selection, but may be edited later, if necessary.

The button 514 for adding another threshold of the same threshold type is engaged when more subtypes of the same threshold supertype require monitoring. Upon engaging the button 514 for adding another threshold of the same threshold type, another instance of the threshold subtype selection tool 512 may appear, allowing for another threshold subtype to be indicated.

V. EXAMPLE METHODS

Figure 6:
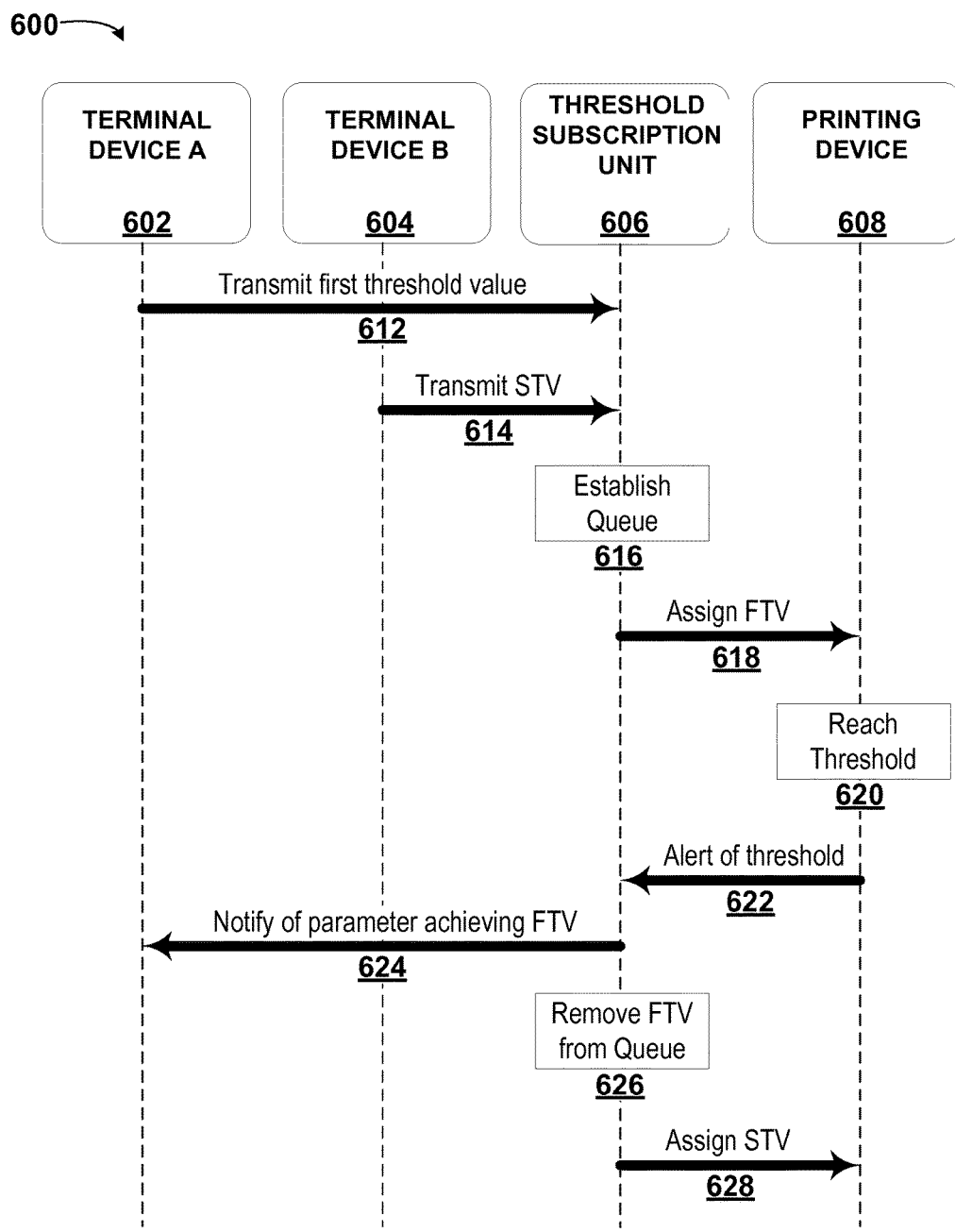
FIG. 6 is a data flow diagram illustrating a method, according to an example embodiment.

FIG. 6 is a data flow diagram illustrating a method 600 of monitoring threshold values, according to an example embodiment. The method 600 is performed through the interaction of a first terminal device (Terminal Device A 602), a second terminal device (Terminal Device B 604), a Threshold Subscription Unit 606, and a Printing Device 608.

In step 612 of method 600 terminal device A 602 transmits a first threshold value (FTV) to the threshold subscription unit 606. The FTV is related to a parameter in the printing device 608 that requires monitoring by terminal device A 602. Upon receiving the FTV, the threshold subscription unit 606 may store the FTV in a long-term storage unit, such as a hard drive, or in a short-term storage unit, such as a RAM.

In step 614 of method 600 terminal device B 604 transmits a second threshold value (STV) to the threshold subscription unit 606. The STV is related to a parameter in the printing device 608 that requires monitoring by terminal device B 604. As in step 612, upon receiving the STV, the threshold subscription unit 606 may store the STV in a long-term storage unit, such as a hard drive, or in a short-term storage unit, such as a RAM.

In step 616 of method 600, the threshold subscription unit 606 establishes a queue. The queue is an ordered list of threshold values received by the threshold subscription unit 606. In some embodiments, establishing the queue may include sensing whether the parameter within the printing device 608 related to the FTV or the STV is trending upward or downward. In doing so, the threshold subscription unit 606 may properly order the threshold values with respect to one another, such that the threshold values at the front of the queue are reached before the threshold values at the back of the queue.

Additionally, establishing a queue may include alerting terminal device A 602 or terminal device B 604 that the FTV or the STV has already been attained by the parameter value in the printing device 608 related to the FTV or the STV, respectively.

Furthermore, the queue may include many threshold values, sent from multiple, additional terminal devices. It need not solely contain the FTV and the STV. Also, while the queue order is depicted as static upon its establishment in method 600, in some embodiments, the queue order may be updated throughout the method 600 as new threshold values are received by the threshold subscription unit 606 or as the parameter values related to the threshold values within the queue change trends (e.g. from trending upward to trending downward).

In step 618 of method 600 the threshold subscription unit 606 assigns the FTV, which was at the front of the queue, to the printing device 608. Assigning the FTV to the printing device 608 may include setting a trigger within the printing device 608, such that when the parameter related to the FTV reaches the FTV, the printing device 608 alerts the threshold subscription unit 606. In some embodiments, step 618 will be omitted, if the value of the parameter related to the FTV within the printing device 608 had previously reached the FTV.

In step 620 of method 600 the value of the parameter related to the FTV within the printing device 608 reaches the FTV. As configured in step 618, this triggers the response of the printing device 608. Step 620 may also include removing the FTV from the memory unit 402 within the printing device 608, as it is no longer needed. In some embodiments, step 620 will be omitted if step 618 were omitted.

In step 622 of method 600 the printing device 608 communicates with the threshold subscription unit 606 in response to the trigger of step 620. This communication includes alerting the threshold subscription unit 606 that the value of the parameter related to the FTV reached the FTV. In addition, the communication may include an indication that the printing device 608 is prepared to be assigned another threshold value from the queue. In some embodiments, step 622 will be omitted if step 618 were omitted.

In step 624 of method 600 the threshold subscription unit 606 notifies terminal device A 602 that the value of the parameter related to the FTV reached the FTV within the printing device 608. In this example embodiment, step 624 is a direct transmission from the threshold subscription unit 606 to terminal device A 602. In other embodiments, step 624 may take a form more similar to a broadcast message, by which the threshold subscription unit 606 communicates to all terminal devices that the FTV has been reached, not just to those devices that transmitted the FTV to the threshold subscription unit 606.

In step 626 of method 600 the threshold subscription unit 606 removes the FTV from the queue. As this value has already been achieved by the parameter related to the FTV within the printing device 608, it no longer needs to be monitored, and is therefore no longer needed in the queue. In removing the FTV from the queue, the STV, previously the second value in the queue, now moves to the front of the queue.

In step 628 of method 600 the threshold subscription unit 606 assigns the STV to the printing unit 608. As with step 618, assigning the STV may include setting a trigger within the printing device 608, such that when the parameter related to the STV reaches the STV, the printing device 608 alerts the threshold subscription unit 606. In some embodiments, step 628 will be omitted, if a value of the parameter related to the STV within the printing device 608 had previously reached the STV.

In some embodiments, steps 620 through 628 of method 600 may repeat with other threshold values, ad infinitum, until there are no more threshold values left in the queue. In this way, each threshold value in the queue is successfully achieved by the printing device 608 and each associated terminal device is notified that the threshold value it transmitted has been reached.

Note that certain steps depicted in FIG. 6 may be omitted and/or other steps may be added, depending on the particular embodiment. In some implementations, some steps may be performed in parallel; for example, transmitting the FTV from terminal device A 602 and transmitting the STV from terminal device B 604 may be performed simultaneously. The retrieval of information may be blocking or non-blocking, depending upon the particular implementation. For instance, because notifying terminal device A 602 of the parameter value related to the FTV achieving the FTV might take time to complete, the threshold subscription unit 606 may simultaneously remove the FTV from the queue.

Figure 7:
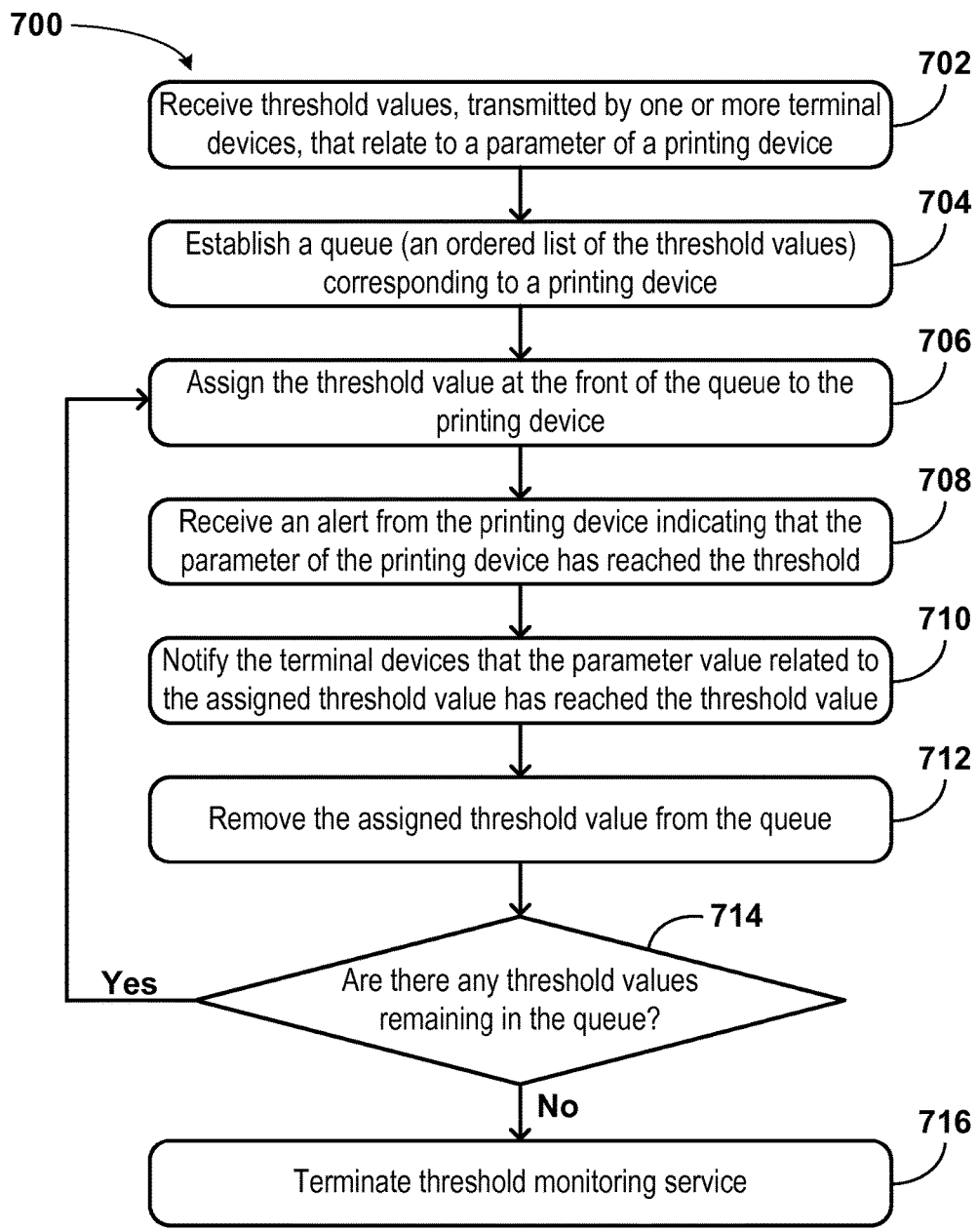
FIG. 7 is a flowchart illustrating a method, according to an example embodiment.

FIG. 7 is a flowchart illustrating a method 700 of monitoring threshold values, according to an example embodiment. The method 700 is performed on a threshold subscription unit 102.

At step 702, the method 700 includes receiving threshold values that relate to a parameter of a printing device 106. The threshold values were transmitted by one or more terminal devices 104. In some embodiments, step 702 will occur repeatedly throughout the method 600.

The threshold values may be communicated through the public Internet by the terminal devices 104. Alternatively, if the terminal devices 104 and the threshold subscription unit 102 are on the same network, the threshold values may be communicated over a LAN.

At step 704, the method 700 includes establishing a queue corresponding to the printing device 106. The queue includes an ordered list of the threshold values received in step 702 corresponding to one or more parameters within the printing device 106. At the front of the queue are the threshold values that correspond to parameter values of the parameters within the printing device 106 that will be obtained before those at the back of the queue.

Once established, the queue may be saved within the threshold subscription unit 102 on a server. Step 704 may further include interrogating the printing device 106 to establish whether the parameters related to the threshold values received in step 702 are trending upward or downward.

Additionally step 704 may include notifying a terminal device (if a threshold value is above a parameter value trending downward or below a parameter value trending upward) that the threshold value transmitted by that terminal device has already been reached by the printing device 106.

As with method 600, method 700 depicts the queue order as static, once it has been established in step 704. In some embodiments, this will not be the case, as additional threshold values are transmitted to the threshold subscription unit 102 throughout the method 700 or as the trending direction of the parameter within the printing device 106 related to the threshold values changes.

At step 706, the method 700 includes assigning the threshold value at the front of the queue to the printing device 106. As previously described, this may include setting a trigger within the printing device 106 that occurs once the parameter value of the parameter related to the threshold value at the front of the queue reaches the threshold value at the front of the queue.

At step 708, the method 700 includes receiving an alert from the printing device 106 indicating that the parameter of the printing device related to the assigned threshold value has reached the assigned threshold value. This transmission could take place over the public Internet, or over a local network, such as a LAN. In some embodiments, the printing device 106 may be directly connected to the threshold subscription unit 102, such as in cloud printing technology.

At step 710, the method 700 includes notifying the terminal devices 104 that the parameter value related to the assigned threshold value has reached the assigned threshold value. As indicated previously, this notification could be in the form of a broadcast to each terminal device signaling that the parameter value related to the assigned threshold value has reached the assigned threshold value.

Alternatively, in some embodiments, this notification will only be transmitted to terminal devices that transmitted the assigned threshold value to the threshold subscription unit 102. In some embodiments, this notification will take place over the public Internet.

At step 712, the method 700 includes removing the assigned threshold value from the queue. As the assigned threshold value has been achieved by the parameter value related to the assigned threshold value, the assigned threshold value no longer needs to be monitored, thus, it is removed. In removing the assigned threshold value from the queue, the next threshold value in the queue, if there is one, now moves to the front of the queue. Consequently, each threshold value in the queue moves forward one location in the queue.

In some embodiments, such as when all threshold values received in step 702 relate to parameter values already attained by parameters within the printing device and therefore the queue is empty, steps 706-712 will be omitted.

At step 714, the method 700 includes determining if there are any threshold values remaining in the queue. In some embodiments, this may include reading the first element stored in an array associated with the queue within the threshold subscription unit 102. If the first element in the array is an empty identifier, such as "null", the threshold subscription unit 102 may presume the queue is empty (there are no more threshold values remaining in the queue).

If there are no more threshold values remaining in the queue, the method proceeds to step 716. However, if there are additional threshold values remaining in the queue, the method reverts to step 706.

At step 716, the method 700 includes terminating the threshold monitoring service. This may include the threshold subscription unit 102 communicating to the terminal devices 104 that there are no more threshold values to be monitored. Additionally, the threshold subscription unit 102 may power down or disconnect from further communication.

Alternatively, the threshold subscription unit 102 may enter a resting state where it waits for an additional threshold value from one or more terminal devices 104 before performing additional actions.

It should be understood that the steps 702-716 might be performed in a different order than that presented in FIG. 7. Various steps and operations may be performed in parallel as well. The order of the operations depicted is provided for explanatory reasons and is merely one example combination of operations for monitoring threshold values using a threshold subscription unit.

VI. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed is:

1. A method, comprising:
    receiving, by a threshold subscription unit, a first threshold value generated and transmitted by a first terminal device and a second threshold value generated and transmitted by a second terminal device, wherein the first threshold value and the second threshold value differ from one another and are values relating to a parameter of a printing device;
    establishing, by the threshold subscription unit, a queue corresponding to the printing device, wherein the queue comprises an ordered list of threshold values for the parameter of the printing device, and wherein the queue includes the first threshold value and the second threshold value;
    assigning, by the threshold subscription unit when a parameter value related to the first threshold value within the printing device has not previously attained a level corresponding to the first threshold value, the first threshold value to the printing device;
    physically measuring, by the printing device, the parameter value related to the first threshold value to determine when the parameter value related to the first threshold value attains a level corresponding to the first threshold value, wherein physically measuring the parameter value comprises weighing a paper tray of the printing device using a digital scale;
    alerting, by the printing device upon the parameter value related to the first threshold value attaining the level corresponding to the first threshold value, the threshold subscription unit that the parameter value related to the first threshold value has attained the level corresponding to the first threshold value;
    notifying, by the threshold subscription unit, the first terminal device that the parameter value related to the first threshold value has attained the level corresponding to the first threshold value;
    removing, by the threshold subscription unit, the first threshold value from the queue;
    assigning, by the threshold subscription unit when a parameter value related to the second threshold value within the printing device has not previously attained a level corresponding to the second threshold value, the second threshold value to the printing device; and physically measuring, by the printing device in response to being assigned the second threshold value, the parameter value related to the second threshold value to determine when the parameter value related to the second threshold value attains the level corresponding to the second threshold value.

2. The method of claim 1, wherein the first threshold value and the second threshold value further comprise a printing device designation, wherein the printing device designation specifies a particular printing device to which the first threshold value and the second threshold value should be assigned.

3. The method of claim 1, wherein establishing the queue further comprises identifying, within the printing device, whether the parameter related to the first threshold value is trending upward or downward, and ordering the first threshold value and second threshold value with respect to one another such that the value of the parameter will attain the level corresponding to the first threshold value prior to attaining the level corresponding to the second threshold value.

4. The method of claim 1, wherein notifying the first terminal device further comprises notifying only the first terminal device and not the second terminal device.

5. The method of claim 1, wherein the parameter of the printing device related to the first threshold value is a paper level.

6. The method of claim 1, wherein assigning the first threshold value to the printing device further comprises setting a trigger value within the printing device corresponding to the first threshold value, such that when the parameter related to the first threshold value attains the level corresponding to the first threshold value, the printing device alerts the threshold subscription unit.

7. The method of claim 1, wherein assigning the second threshold value to the printing device further comprises setting a trigger value within the printing device corresponding to the second threshold value.

8. The method of claim 1, wherein the threshold subscription unit is a cloud server that communicates with the first terminal device, the second terminal device, and the printing device via the public Internet.

9. The method of claim 1, further comprising:
alerting, by the printing device upon the parameter value related to the second threshold value attaining the level corresponding to the second threshold value, the threshold subscription unit that the parameter value related to the second threshold value has attained the level corresponding to the second threshold value;
notifying, by the threshold subscription unit, the second terminal device that the parameter value related to the second threshold value has attained the level corresponding to the second threshold value; and
removing, by the threshold subscription unit, the second threshold value from the queue.

10. A threshold subscription unit, configured to:
receive a first threshold value generated and transmitted by a first terminal device and a second threshold value generated and transmitted by a second terminal device, wherein the first threshold value and the second threshold value differ from one another and are values relating to a parameter of a printing device;
receive an alert from the printing device signaling that a parameter value related to the first threshold value has attained a level corresponding to the first threshold value, wherein the alert was transmitted by the printing device upon the parameter value related to the first threshold value attaining the level corresponding to the first threshold value as physically measured by the printing device;
assign the first threshold value, when the parameter value related to the first threshold value has not attained the level corresponding to the first threshold value, and the second threshold value, when a parameter value related to the second threshold value has not attained a level corresponding to the second threshold value, to the printing device, wherein the assigning of the second threshold value occurs upon receiving the alert from the printing device;
notify the first terminal device or the second terminal device of the alert;
add the first threshold value and the second threshold value to a queue corresponding to the printing device, wherein the queue comprises an ordered list of threshold values for the parameter of the printing device; and
remove the first threshold value from the queue, wherein the first threshold value is removed from the queue upon receiving the alert.

11. The threshold subscription unit of claim 10, wherein the first threshold value and the second threshold value further comprise a printing device designation, wherein the printing device designation specifies a particular printing device to which the first threshold value and the second threshold value should be assigned.

12. The threshold subscription unit of claim 10, wherein the parameter of the printing device related to the first threshold value is a toner level, a paper level, an error count, an error ratio, a paper jam count, a number of jobs processed count, a pending jobs count, a functional counter, a color counter, a paper size counter, or a coverage level counter.

13. The threshold subscription unit of claim 10, wherein assigning the first threshold value to the printing device further comprises setting a trigger value within the printing device, such that when the parameter related to the first threshold value attains the level corresponding to the first threshold value, the printing device alerts the threshold subscription unit.

14. The threshold subscription unit of claim 10, wherein the threshold subscription unit is a cloud server that communicates with the one or more terminal devices and the printing device via the public Internet.

15. The threshold subscription unit of claim 10, wherein notifying the first terminal device or the second terminal device of the alert further comprises notifying only those terminal devices from which the threshold subscription unit received the first threshold value or the second threshold value.

16. A printing device, configured to:
individually (one at a time) store a first threshold value and a second threshold value, wherein the first threshold value and second threshold value differ from one another and are values relating to a parameter of the printing device, wherein the first threshold value was generated and transmitted by a first terminal device and the second threshold value was generated and transmitted by a second terminal device, and wherein the first threshold value and the second threshold value were separately assigned by a threshold subscription unit;
monitor a parameter value related to the first threshold value, wherein monitoring the parameter value related to the first threshold value comprises physically measuring the parameter value related to the first threshold value;

compare the first threshold value to the parameter value related to the first threshold value to determine when the parameter value related to the first threshold value attains a level corresponding to the first threshold value;

transmit an alert to the threshold subscription unit, wherein the alert signals that the parameter value related to the first threshold value has attained the level corresponding to the first threshold value;

receive assignments of the first threshold value, when the parameter value related to the first threshold value has not attained the level corresponding to the first threshold value, and the second threshold value, when a parameter value related to the second threshold value has not attained a level corresponding to the second threshold value, from the threshold subscription unit, wherein the second threshold value is received after the transmission of the alert, and wherein the parameter of the printing device related to the first threshold value is a toner level, a paper level, an error count, an error ratio, a paper jam count, a number of jobs processed count, a pending jobs count, a functional counter, a color counter, a paper size counter, or a coverage level counter; and monitor, in response to receiving assignment of the second threshold value, the parameter value related to the second threshold value, wherein monitoring the parameter value related to the second threshold value comprises physically measuring the parameter value related to the second threshold value, and wherein the parameter of the printing device related to the second threshold value is a toner level, a paper level, an error count, an error ratio, a paper jam count, a number of jobs processed count, a pending jobs count, a functional counter, a color counter, a paper size counter, or a coverage level counter.

17. The printing device of claim 16, wherein the first threshold value and the second threshold value further comprise a printing device designation, wherein the printing device designation specifies a particular printing device to which the first threshold value and the second threshold value should be assigned.

18. The printing device of claim 16, further configured to:
compare the second threshold value to the parameter value related to the second threshold value to determine when the parameter value related to the second threshold value attains a level corresponding to the second threshold value; and transmit a second alert to the threshold subscription unit, wherein the second alert signals that the parameter value related to the second threshold value has attained the level corresponding to the second threshold value.

19. The printing device of claim 16, wherein monitoring the parameter related to the first threshold value further comprises setting a trigger value within the printing device associated with the first threshold value, such that when the parameter related to the first threshold value attains the level corresponding to the first threshold value, the printing device alerts the threshold subscription unit.

20. The printing device of claim 16, wherein the threshold subscription unit is a cloud server that communicates with the one or more terminal devices and the printing device via the public Internet.

* * * * *